Figure 1:
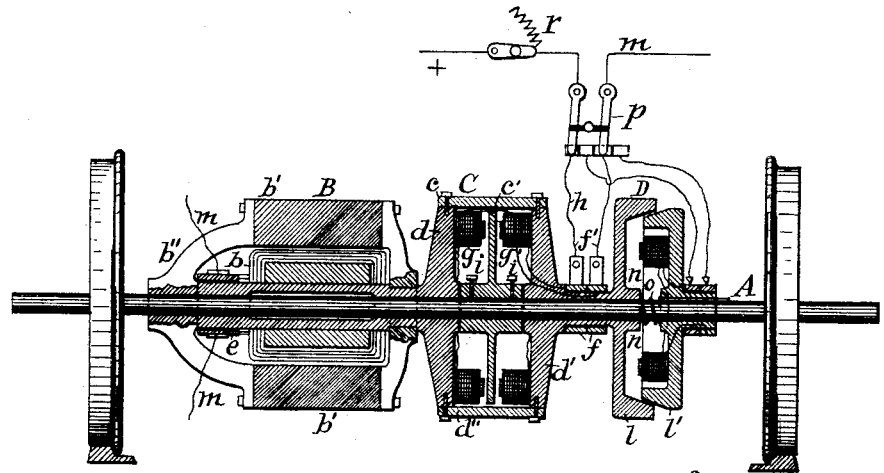

(No Model.)

M. W. DEWEY.
POWER TRANSMITTING MECHANISM FOR ELECTRIC LOCOMOTIVES.

No. 513,895. Patented Jan. 30, 1894.

WITNESSES:
J. J. Laass
C. L. Bendixon

INVENTOR,
Mark W. Dewey.
By Duell, Laass & Duell,
his ATTORNEYS.

UNITED STATES PATENT OFFICE.

MARK W. DEWEY, OF SYRACUSE, NEW YORK, ASSIGNOR TO THE DEWEY CORPORATION, OF SAME PLACE.

POWER-TRANSMITTING MECHANISM FOR ELECTRIC LOCOMOTIVES.

SPECIFICATION forming part of Letters Patent No. 513,895, dated January 30, 1894.

Application filed April 17, 1891. Serial No. 389,270. (No model.)

*To all whom it may concern:*

Be it known that I, MARK W. DEWEY, of Syracuse, in the county of Onondaga, in the State of New York, have invented new and useful Improvements in Electric Motion-Transmitters, (Case No. 90,) of which the following, taken in connection with the accompanying drawings, is a full, clear, and exact description.

My invention relates to means for transmitting motion from a motor to a shaft or wheel the same or similar to that set forth in my Patent No. 439,577, dated October 28, 1890, and a friction-clutch of any suitable construction, but preferably an electrically operated friction clutch.

The object of my invention is to provide means with my frictionless motion transmitter or electric speed reducing mechanism, whereby, when the shaft, axle or wheel to be driven, has reached its maximum speed through the said speed reducing mechanism, its speed may be still further increased by connecting it with the motor rigidly, either directly or through suitable gearing. For instance, when it is desired to propel a car, provided with my invention, at a high speed, the electric motor is first put in motion, then the electric motion transmitter above referred to, is placed in circuit so that the motion of the motor will be gradually and flexibly transmitted to the axle, and at a somewhat reduced speed, depending in a great measure upon the strength of the magnets of the transmitter; and then after the highest speed that can be produced by the said transmitter is reached, the axle is connected directly with the motor through a friction clutch, so that if desired the speed of the axle may equal that of the motor and so that the speed reducer may be cut out of circuit to economize the current. When it is desired to stop the car, the transmitter or speed reducer is energized, to its fullest extent, the connection by the friction clutch removed, then the current is gradually decreased through the magnets of the transmitter until it is de-energized or the car is at rest. It will be understood, of course, that the motor may be run continuously if desired, and that any suitable and well known regulating devices may be employed therewith.

My invention consists in the combination with an electric motor and a shaft or wheel to be driven, of an electric speed reducing mechanism connected to the moving part of the motor and to the said shaft or wheel, and consisting of two parts in close proximity to and adapted to electrically attract or repel each other, and a friction clutch also connected to the moving part of the motor, and to the said shaft or wheel.

My invention consists also in the combination with an electric motor and a shaft or wheel to be driven, of an electric speed reducing mechanism connected to the moving part of the motor and to the said shaft or wheel, and consisting of two parts in close proximity to and adapted to electrically attract or repel each other, and an electro magnetic friction-clutch consisting of two members adapted to engage each other, one of which is provided with an energizing coil, whereby it may attract the other member, and a spring to separate one member from the other when there is no attraction.

My invention consists further in the combination of an electric speed reducing mechanism consisting of a member having one or more movable plates or disks of conducting material and another member having a series of electro magnets secured thereto and arranged to be moved in proximity to the said plates or disks, a motor connected to one of the said members to rotate the same, an electro magnetic friction clutch consisting of two members adapted to engage each other, one of which is provided with one or more electromagnets, a supply circuit, and a switch to connect said circuit alternately with the magnets of the speed reducing mechanism and the magnets of the clutch mechanism. And my invention consists in certain other combinations hereinafter described and specifically set forth in the claims.

Figure 2:
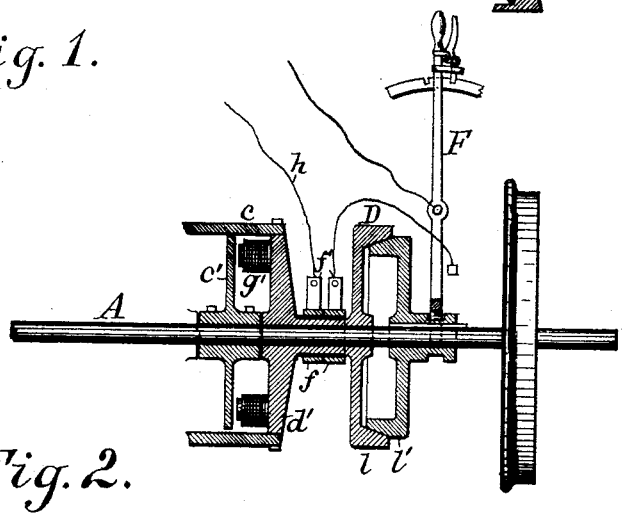
Figure 3:
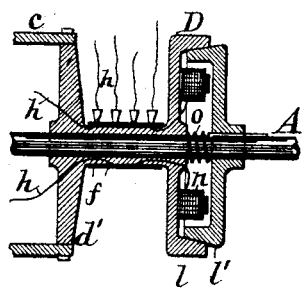

Referring to the drawings, Figure 1 is an elevation of a car axle and wheels having an electric motor, an electric speed reducing mechanism, and a friction clutch in section mounted thereon. Fig. 2 is a sectional view of another form of friction clutch that may be employed, and Fig 3 is a modified form of the clutch shown in Fig. 1.

In the drawings A— represents a shaft with wheels thereon, or the axle and wheels of a car.

B— is an electric motor for driving the said shaft or axle.

C— is the mechanism for transmitting a reduced motion from the motor to that axle, and —D— is the friction clutch for connecting the axle directly with the motor.

Fig. 1 illustrates my preferred arrangement of the apparatus for transmitting motion to the axle —A— from the motor —B— consisting in mounting the armature of the motor loosely upon the said axle and axially concentric with the same, thus dispensing with all gear wheels or equivalents. To effect this, the armature —b— or moving part of the motor is sleeved upon the axle while the field magnet —b'— is held stationary by suitably securing it to the truck frame. Upon about the middle of the armature-shaft or sleeve —b''— is fixed a part of the electric speed transmitting and reducing mechanism —C—. In this case the part —c— of the said mechanism fixed to the armature-shaft is preferably formed integral with the same, and consists of two disks —d—d'— a distance apart, arranged facing each other and coupled together at their peripheries by a ring or cylinder —d''— encircling them and bolted thereto. Upon the inner faces of each of the disks —d— and —d'— and near their peripheries are fixed a series of electro magnets —g— and —g'—, with the poles of one series opposite to and facing the poles of the other series, but a distance apart.

The coils of the magnets may be wound and connected in circuit in any desired manner, but preferably in series. In order to conduct the current to the said magnets, I provide a two ring commutator —f— which is mounted upon but insulated from the hub of the disk —d'— and shown in section. Fixed brushes —f'—f'— connected with the terminals of the electric supply conductor —h— bear yieldingly upon the rings which are connected to the terminals of the conductor containing the coils of the magnets. Between the poles of said magnets is arranged a circular plate or disk —c'— of conducting material—as iron or copper, preferably the latter—which is fixed to or forms a part of a hub which is securely keyed or fastened to the axle —A— by set-screws —i—i. This disk and its connection constitute the second part or member of the power transmitting and reducing mechanism.

Upon the end of the armature shaft —b''— opposite the end carrying the motor commutator —e— is fixed a part or member —l— of the friction clutch —D. The other part or member —l'— of the clutch is secured to the shaft or axle —A— by a spline and groove so that it may slide upon but rotate with the axle. The part of the friction clutch secured to the axle is a conically-shaped hub which is adapted to engage the inner sides of the conically shaped hub —l— fixed to the motor shaft —b''. The rubbing portions of the parts —l— and —l'— may be inclined to any suitable angle desired. In Fig. 1 the said parts are shown separated and the magnets —n— employed to draw them together are fixed to the sliding part, the two ringed commutator being mounted upon the latter part, but in Fig. 3 the magnets and commutator are mounted upon the part fixed to the motor shaft so that the sliding part —l'— which then forms the armature for the magnets can be more easily moved.

I have shown in both figures a coil spring —o— between the parts to separate them when the magnets are deenergized but any other suitable means may be employed for the purpose.

In order that the speed reducing mechanism and friction clutch may be connected with the supply circuit —m— alternately, I provide a double pole switch —p— so that when placed in one position, or in the position shown in Fig. 1, it will connect the circuit —m— with the terminals of the speed reducing mechanism and when it is in another position or moved to the right from the position in which it is shown it will connect the circuit —m— with the terminals of the clutch mechanism. The terminals of the mechanisms are so placed, however, that upon moving the said switch when taking the clutch out, and placing the speed reducing mechanism in circuit, the latter will be placed in circuit before the clutch is really cut out.

r— is an adjustable resistance in the circuit —m— to regulate the strength of the magnets in either and both mechanisms.

In Fig. 2 I have shown the clutch or sliding member thereof operated by a hand lever —F— instead of by electro magnets. In connection with this lever is shown means whereby the speed reducing mechanism is cut out of circuit when the lever is moved to place the members of the clutch in contact with each other. This is effected by connecting one terminal of the circuit with the fulcrum of the lever and the other terminal with a contact to be separated from the lever when it is moved to bring the members of the clutch together.

Having described my invention, what I claim as new, and desire to secure by Letters Patent, is—

1. The combination with an electric motor and a shaft or wheel to be driven, of an electric speed reducing mechanism connected to the moving part of the motor and to the said shaft or wheel, and consisting of two parts in close proximity to and adapted to electrically attract or repel each other, and a friction clutch also connected to the moving part of the motor, and to the said shaft or wheel.

2. The combination with an electric motor and a shaft or wheel to be driven, of an electric speed reducing mechanism connected to the moving part of the motor and to the said shaft or wheel, and consisting of two parts in close proximity to and adapted to electrically attract or repel each other, a friction clutch having two members adapted to engage each other, one of which is connected to the moving part of the motor and the other to the shaft or wheel, and suitable means for operating the clutch.

3. The combination with an electric motor and a shaft or wheel to be driven, of an electric speed reducing mechanism connected to the moving part of the motor and to the said shaft or wheel, and consisting of two parts in close proximity to and adapted to electrically attract or repel each other, and a conical friction clutch mechanism connected to the moving part of the motor and the said shaft or wheel, for the purpose described.

4. The combination with an electric motor and a shaft or wheel to be driven, of an electric speed reducing mechanism connected to the moving part of the motor and to the said shaft or wheel, and consisting of two parts in close proximity to and adapted to electrically attract or repel each other, and an electro-magnetic friction clutch consisting of two members adapted to engage each other, one connected to the moving part of the motor and the other to said shaft or wheel, and one of which is provided with an energizing coil.

5. The combination with an electric motor and a shaft or wheel to be driven, of an electric speed reducing mechanism connected to the moving part of the motor and to the said shaft or wheel, and consisting of two parts in close proximity to and adapted to electrically attract or repel each other, an electro-magnetic friction clutch consisting of two members adapted to engage each other, one connected to the moving-part of the motor and the other to said shaft or wheel, and one of which is provided with an energizing coil whereby it may attract the other member, and a spring to separate one member from the other when there is no attraction.

6. The combination with a shaft and an electric motor to drive said shaft having its armature mounted loosely upon and axially concentric with said shaft, of an electric speed reducing mechanism connected to the moving part of the motor and to the said shaft or wheel, and consisting of two parts in close proximity to and adapted to electrically attract or repel each other, and a friction clutch also connected to the moving part of the motor, and to the said shaft or wheel.

7. The combination, with a shaft and an electric motor to drive said shaft having its armature mounted loosely upon and axially concentric with said shaft, of an electric speed reducing mechanism connected to the moving part of the motor and to the said shaft and consisting of two parts in close proximity to and adapted to electrically attract or repel each other, an electro-magnetic friction clutch consisting of two members adapted to engage each other, one connected to the motor and the other to the said shaft, and one of which is provided with an energizing coil whereby it may attract the other member, and a spring to separate one member from the other when there is no attraction.

8. The combination with an electric motor and a shaft or wheel to be driven, of an electric speed reducing mechanism connected to the moving part of the motor and to the said shaft or wheel, and consisting of two parts in close proximity to and adapted to electrically attract or repel each other, and an electro-magnetic friction clutch consisting of two members adapted to engage each other, one of which is provided with an energizing coil, and a switch for alternately connecting the supply circuit with the speed reducing mechanism and the clutch mechanism, for the purpose described.

9. The combination with an electric motor and a car axle or wheel to be driven, of an electric speed reducing mechanism connected to the moving part of the motor and to the said car axle or wheel, and consisting of two parts in close proximity to and adapted to electrically attract or repel each other, and a friction clutch also connected to the moving part of the motor, and to the said car axle or wheel.

10. The combination with a car axle and an electric motor to drive said car axle having its armature mounted loosely upon and axially concentric with said car axle, of an electric speed reducing mechanism connected to the moving part of the motor and to the said car axle, and consisting of two parts in close proximity to and adapted to electrically attract or repel each other, and a friction clutch also connected to the moving part of the motor, and to the said car-axle.

11. The combination of an electric speed reducing mechanism consisting of a member having a movable plate or disk of conducting material and another member having a series of electro magnets secured thereto and arranged to be moved in proximity to the said plate or disk, a motor connected to one of the said members to rotate the same, an electro magnetic friction clutch consisting of two members adapted to engage each other, one of which is provided with one or more electro magnets, a supply circuit, and a switch to connect said circuit alternately with the magnets of the speed reducing mechanism and the magnets of the clutch mechanism for the purpose described.

In testimony whereof I have hereunto signed my name this 14th day of April, 1891.

MARK W. DEWEY. [L. S.]

Witnesses:
C. L. BENDIXON,
H. M. SEAMANS.